(12) United States Patent
Kortum et al.

(10) Patent No.: US 7,010,169 B2
(45) Date of Patent: Mar. 7, 2006

(54) MULTI-POINT PREDICTIVE FOVEATION FOR BANDWIDTH REDUCTION OF MOVING IMAGES

(75) Inventors: Philip Ted Kortum, Austin, TX (US); Marc Andrew Sullivan, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 637 days.

(21) Appl. No.: 10/123,061

(22) Filed: Apr. 15, 2002

(65) Prior Publication Data

US 2003/0194141 A1 Oct. 16, 2003

(51) Int. Cl.
*G06K 9/36* (2006.01)

(52) U.S. Cl. ...................................... 382/239

(58) Field of Classification Search ........ 382/232–233, 382/238–240, 243, 236, 244–252; 348/384.1, 348/387.1, 390.1; 375/240, 240.01
See application file for complete search history.

(56) References Cited

U.S. PATENT DOCUMENTS

| | | | |
|---|---|---|---|
| 5,282,255 A | * | 1/1994 | Bovik et al. ................ 382/239 |
| 6,014,653 A | | 1/2000 | Thaler |
| 6,182,114 B1 | | 1/2001 | Yap et al. |
| 6,252,989 B1 | | 6/2001 | Geisler et al. |
| 6,351,335 B1 | | 2/2002 | Perlin |
| 6,417,861 B1 | | 7/2002 | Deering et al. |
| 6,424,343 B1 | | 7/2002 | Deering et al. |
| 6,426,755 B1 | | 7/2002 | Deering |
| 6,829,391 B1 | * | 12/2004 | Comaniciu et al. ......... 382/243 |
| 6,836,569 B1 | * | 12/2004 | Le Pennec et al. ......... 382/260 |
| 6,850,236 B1 | * | 2/2005 | Deering ....................... 345/428 |
| 2001/0017651 A1 | | 8/2001 | Baker et al. |
| 2001/0028352 A1 | | 10/2001 | Naegle et al. |
| 2001/0033287 A1 | | 10/2001 | Naegle et al. |
| 2001/0055025 A1 | | 12/2001 | Deering et al. |
| 2002/0003543 A1 | | 1/2002 | Deering |
| 2002/0005862 A1 | | 1/2002 | Deering |
| 2002/0015041 A1 | | 2/2002 | Naegle et al. |
| 2002/0064314 A1 | | 5/2002 | Comaniciu et al. |

* cited by examiner

*Primary Examiner*—Jose L. Couso
(74) *Attorney, Agent, or Firm*—Brinks Hofer Gilson & Lione

(57) ABSTRACT

A scene of an image sequence is compressed using a number of foveation zones, each foveation zone being weighted based on a probability of a viewer looking at a corresponding portion of the first scene. Another scene of the image sequence is compressed using a different number of foveation zones, each foveation zone being weighted based on a probability of a viewer looking at a corresponding portion of the second scene.

30 Claims, 3 Drawing Sheets

| A | G | D | S | Z |
|---|---|---|---|---|
| M | Y | T | R | F |
| B | K | X | U | W |
| N | Z | Y | O | P |
| Q | L | J | D | E |
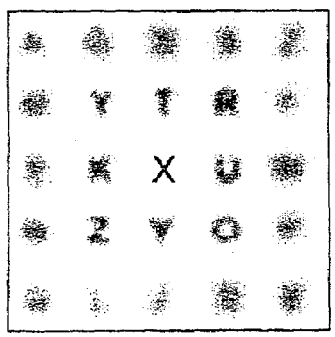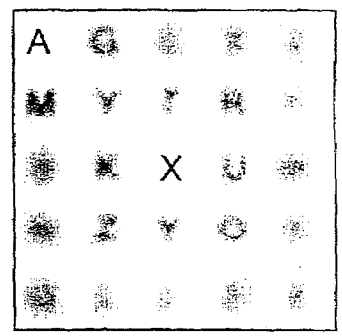
FIG. 3  FIG. 4  FIG. 5

MULTI-POINT PREDICTIVE FOVEATION FOR BANDWIDTH REDUCTION OF MOVING IMAGES

BACKGROUND OF THE INVENTION

1. Field of the Invention

The present invention relates to image compression methods which use foveation.

2. Description of the Related Art

Foveation is a compression method in which an image is compressed so that it matches an ability of a human visual system to detect detail in a peripheral visual field. Methods of image compression using foveation are disclosed in U.S. Pat. No. 6,252,989 to Geisler and Kortum. Foveation is a powerful method of image compression because of high compression rates and perceptually lossless images which result. Drawbacks of the method include requiring real-time knowledge of where a user is looking, and not easily supporting multi-viewer environments.

BRIEF DESCRIPTION OF THE DRAWINGS

The present invention is pointed out with particularity in the appended claims. However, other features are described in the following detailed description in conjunction with the accompanying drawings in which:

FIG. 3 shows an example of an unfoveated image;

FIG. 4 shows the image with a simulated single point foveation; and

FIG. 5 shows the image with a simulated multi-point foveation.

DETAILED DESCRIPTION OF THE PREFERRED EMBODIMENTS

Embodiments of the present invention employ multiple zones of foveation which facilitates use in a multi-viewer environment without real-time knowledge of each viewer's gaze. Each foveation zone is weighted based on a probability of a viewer looking at a specific location in a scene. Center points of the foveation zones may be determined either algorithmically or empirically. Implementation of the multi-point foveation compression scheme allows movies of significantly higher quality to be delivered over a telecommunication network, such as a Digital Subscriber Line (DSL) network, without a corresponding increase in required bandwidth.

Embodiments of the present invention are described with reference to FIG. 1, which is a flow chart of an embodiment of a method of multi-point predictive foveation, and FIG. 2, which is a block diagram of an embodiment of a system for multi-point predictive foveation. Consider an image sequence 10 depicted in FIG. 2. Examples of the image sequence 10 include, but are not limited to, all or part of a television program, a movie, a live video event, an output of a Web camera, and other video events which provide moving images. The events captured in the image sequence 10 may be either live or recorded.

The image sequence 10 comprises a plurality of scenes. For example, the image sequence 10 may include scenes 12, 14, 16 and 20. The different scenes may be defined by different cameras, different perspectives of a camera, different periods in time, different locations, and/or different objects captured in the images. As depicted in FIG. 2, the different scenes 12, 14, 16 and 20 may consist of different numbers of images and/or have different lengths of time.

The image sequence 10 is to be compressed either to reduce a bandwidth required to transmit a compressed version thereof or to reduce an amount of data required to store the compressed version thereof. For example, the compressed version may be transmitted by a telecommunication network 22 to one or more viewers. Examples of the telecommunication network 22 include, but are not limited to, a digital subscriber line (DSL) network, a digital cable television transmission network, a satellite transmission network, and a computer network such as an internet or an intranet. Alternatively, the compressed version may be stored to a storage device 24. Examples of the storage device 24 include, but are not limited to, an optical storage medium such as a digital video disk (DVD) or a compact disk (CD), a magnetic storage medium such as a magnetic disk, and an electronic storage medium such as a memory card.

Figure 1:
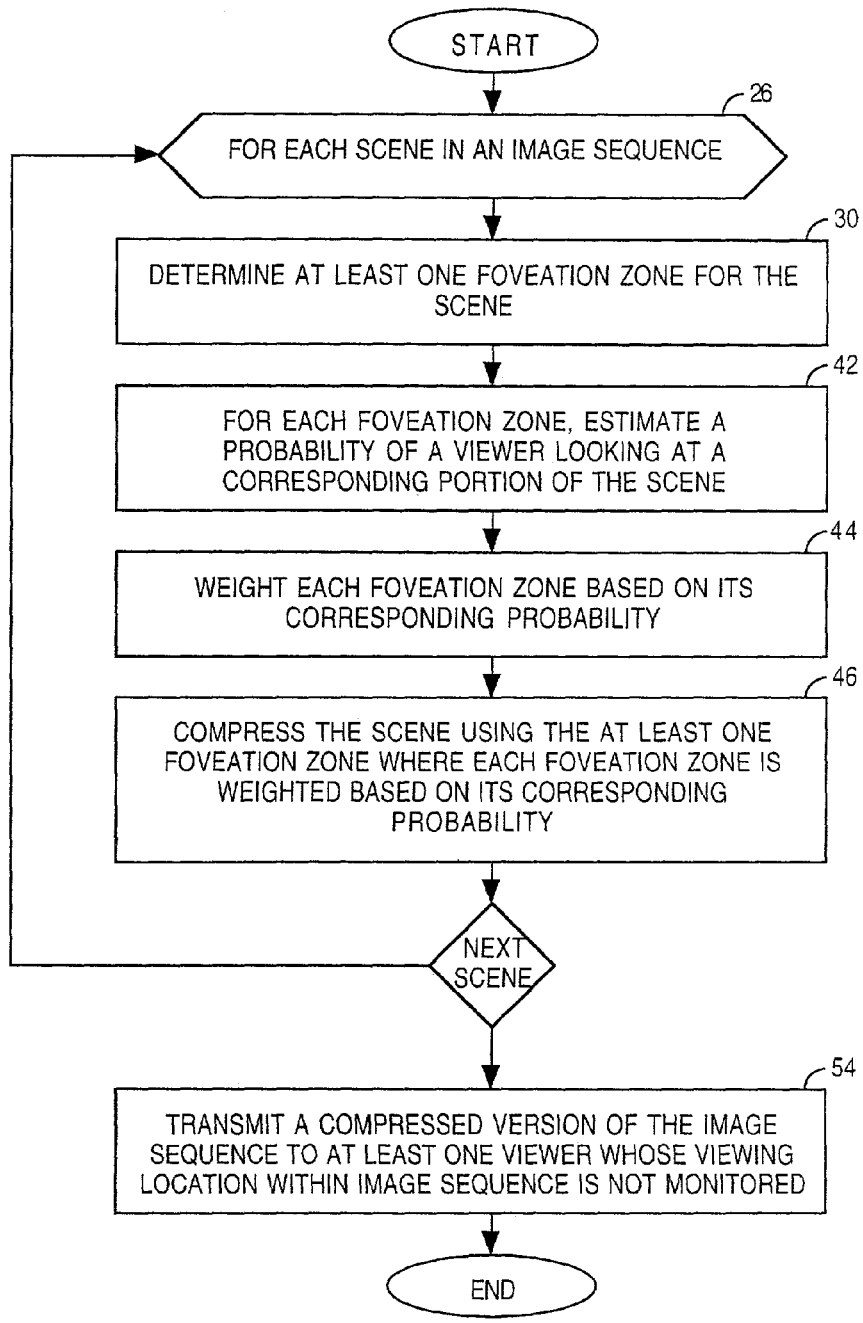
FIG. 1 is a flow chart of an embodiment of a method of multi-point predictive foveation.
Figure 2:
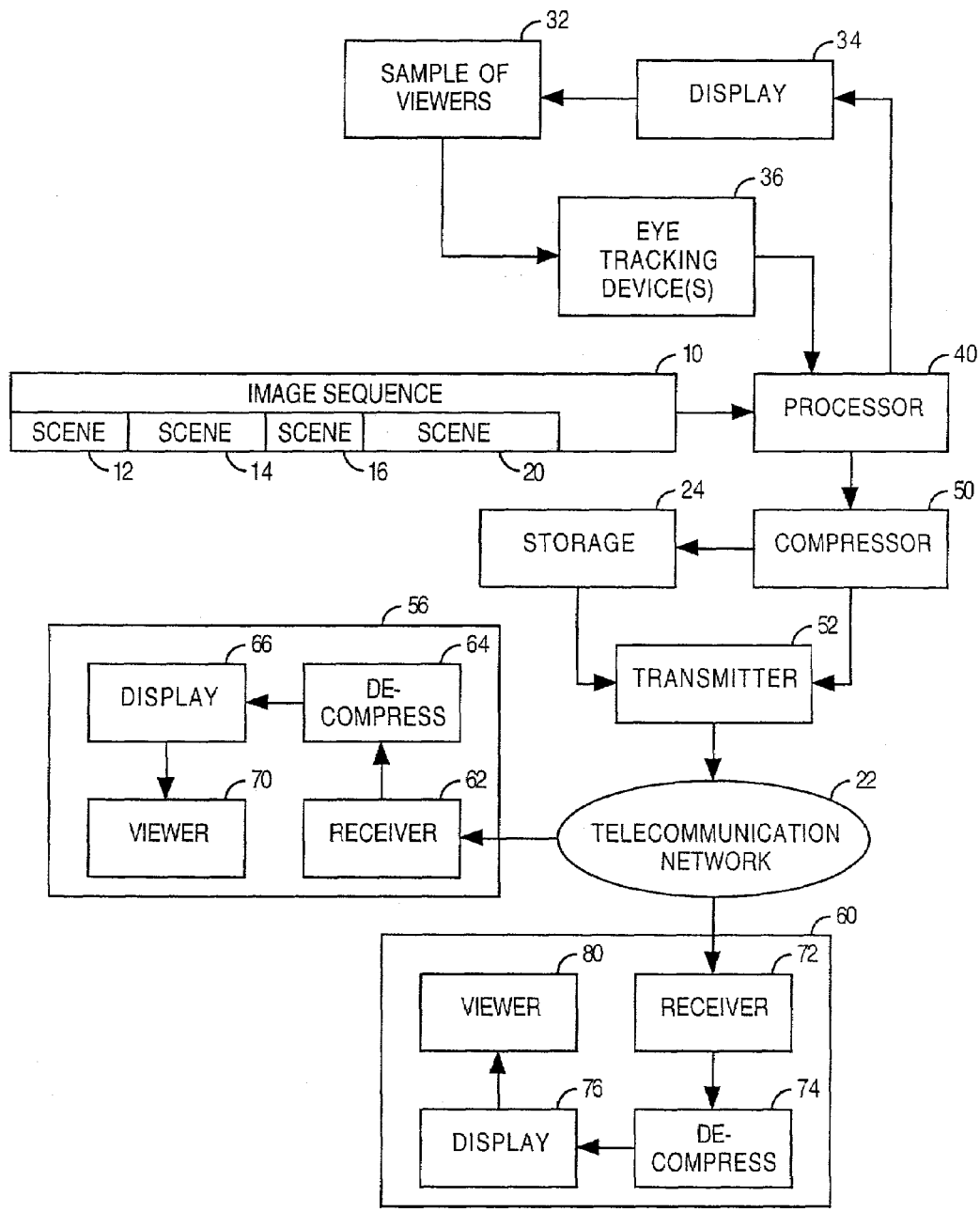
FIG. 2 is a block diagram of an embodiment of a system for multi-point predictive foveation.

Referring to block 26 in FIG. 1, a series of acts is performed for each scene in the image sequence 10. As indicated by block 30, an act of determining at least one foveation zone is performed for a scene in the image sequence 10. Each foveation zone may be determined either empirically or algorithmically.

To empirically determine the foveation zones, the image sequence 10 is displayed to a sample of viewers 32 using a display device 34. One or more eye tracking devices 36 sense where within each of the different scenes each of the viewers 32 is viewing. For the purpose of this disclosure, the portion of a scene that a viewer is viewing is called a "view location". The viewers 32 may be either simultaneously watching the image sequence 10 or watching the image sequence 10 at different times.

The view locations within each scene are determined for the sample of viewers 32 using the eye tracking devices 36. A processor 40 is responsive to view location data from the eye tracking devices 36 to determine one or more foveation zones for each scene. The processor 40 determines the foveation zones based on clusters of the view locations.

To algorithmically determine the foveation zones, the sample of viewers 32, the display 34, and the eye tracking devices 36 may be omitted. In contrast, the foveation zones are determined based on a scene type and objects in the scene. The processor 40 performs acts to determine the foveation zones based on computer program code which assists in recognizing the scene type and objects in the scene. Examples of different scene types include, but are not limited to, a high action scene and a conversation scene. Examples of different objects in a scene include, but are not limited to, humans in a scene, and moving objects in a scene. The processor 40 may assign one foveation zone to each high action scene, and two foveation zones to a conversational scene between two people, for example.

To illustrate the determination of different foveation zones, consider the scenes 12, 14, 16 and 20 in the image sequence 10. For purposes of illustration and example, the scene 12 comprises a sequence of images of having two main foreground objects—a human and a dog in a room; the scene 14 comprises a sequence of images of a conversation between the human and another human in the room; the scene 16 comprises a sequence of images of a fight between the two humans in the room; and the scene 20 comprises a sequence of images of the human running out of the room after the fight.

Either empirically or algorithmically, it is determined in the above example that: the scene 12 has two foveation zones—one for the human and one for the dog; the scene 14 has two foveation zones—one for each human; the scene 16 has one foveation zone at a central portion of the fighting action; and the scene 20 has one foveation zone which follows the human as he runs out of the room.

In general, an image sequence will have scenes with different numbers of foveation zones. In other words, some scenes will have either more or fewer foveation zones than other scenes in the image sequence. Also, it is noted that some scenes may have three or more foveation zones.

As indicated by block 42, a corresponding probability of a viewer looking at a corresponding portion of the scene is estimated for each foveation zone. Each probability may be determined either empirically or algorithmically. Empirically, the probability may be based on the proportion of the viewers 32 whose view locations are within a corresponding foveation zone. Algorithmically, the probability may be determined by the processor 40 based on an expected proportion of viewers whose view locations will be within a corresponding foveation zone. The expected proportion may based on the scene type and objects in the scene.

Continuing with the above example, either empirically or algorithmically the following probabilities are assigned to the various foveation zones in the image sequence 10. In the scene 12, the foveation zone associated with the human has a probability of 0.8 and the foveation zone associated with the dog has a probability of 0.1. In the scene 14, the foveation zone associated with the human has a probability of 0.5 and the foveation zone associated with the other human is 0.5. In the scene 16, the single foveation zone has a probability of about 1. In the scene 20, the single foveation zone has a probability of about 1.

As indicated by block 44, the method comprises weighting each foveation zone based on its corresponding probability. The foveation zones are weighted so that more resolution is associated with portions of the scenes having a greater probability of being viewed. In general, the foveation zones may be definable by either a continuous falloff function or a discrete function. Examples of specific types of foveation functions are disclosed in U.S. Pat. No. 6,252,989 to Geisler and Kortum, which is hereby incorporated by reference into the present disclosure.

For a continuous falloff function, each foveation zone may have a corresponding half-resolution constant based on the probability of a viewer looking at the corresponding portion of the scene. Thus, for a scene having a first foveation zone and a second foveation zone, where the first foveation zone has a greater probability of a viewer looking at its corresponding portion than the second foveation zone, the half-resolution constant of the first foveation zone is greater than the half-resolution constant of the second foveation zone. For example, in the scene 12, the half-resolution constant associated with the human is greater than the half-resolution constant associated with the dog.

For a discrete falloff function, each foveation zone may have a corresponding fixed resolution based on the probability of a viewer looking at the corresponding portion of the scene. Thus, for a scene having a first foveation zone and a second foveation zone, where the first foveation zone has a greater probability of a viewer looking at its corresponding portion than the second foveation zone, the resolution of the first foveation zone is greater than the resolution of the second foveation zone. For example, in the scene 12, the resolution of the human may fixed at 2400-by-1100 pixels, the resolution of the dog may be fixed at 1200-by-700 pixels, and the resolution of the remainder of scene may be fixed at 640-by-480.

As indicated by block 46, the method comprises compressing each scene using its corresponding at least one foveation zone. The act of compressing is performed by a compressor 50. By compressing all of the scenes, the compressor 50 generates a compressed version of the image sequence 10. The compressed version may be stored to the storage device 24 and/or transmitted (block 52) by a transmitter 54 in communication with the telecommunication network 22. Examples of the transmitter 54 include, but are not limited to, a modem, a computer network interface, a radio frequency transmitter, an optical transmitter, and other wireless and wireline transmitters.

For purposes of illustration and example, consider the telecommunication network 22 comprising a DSL network, and the image sequence 10 comprising a movie. The compressed version of the movie is communicated via the DSL network to a plurality of different viewer's premises, including a viewer's premise 56 and a viewer's premise 60. The premise 56 has a receiver 62 which receives the compressed version via the DSL network, an optional decompressor 64 which decompresses the compressed version, and a display 66 to display the movie to a viewer 70. Similarly, the premise 60 has a receiver 72 which receives the compressed version via the DSL network, an optional decompressor 74 which decompresses the compressed version, and a display 76 to display the movie to a viewer 80. In general, each of the receivers 62 and 72 may be embodied by a modem, a computer network interface, a radio frequency receiver, an optical receiver, or other wireless or wireline receivers. Each of the optional decompressors 64 and 74 may be embodied by a general purpose computer, for example. Each of the displays 66 and 76 may be embodied by a computer monitor or a television, for example.

Typically, the decompressors 64 and 74 are used in embodiments where the image sequence is compressed by both foveated compression and another form of compression, e.g. an MPEG (Moving Pictures Expert Group) standard such as MPEG4. However, in embodiments where the image sequence is compressed using substantially only foveated compression, the decompressors 64 and 74 may be omitted.

It is noted that the viewers' 70 and 80 view locations within the movie are not necessarily monitored by eye tracking devices. Thus, the compression of the movie is independent of viewing behavior of the viewers 70 and 80. However, the compression of the movie is based on a predicted behavior of the viewers 70 and 80. For example, in the scene 12, the viewer 70 may be looking at the human while the viewer 80 is looking at the dog. For a typical movie, the entire movie is compressed based on the eye behavior of the sample of viewers 32 before the viewers 70 and 80 have access to the movie. However, in live event applications, the video may be compressed in real-time based on the eye behavior of the sample of viewers 32. Thus, the viewers 70 and 80 would have a slightly-delayed access to the compressed version of the live video.

FIGS. 3 to 5 illustrate how different numbers of foveation zones affect an image. FIG. 3 shows an example of an unfoveated image. FIG. 4 shows the same image with a simulated single point foveation at the "X". The resulting foveation zone about the "X" is more detailed than the remainder of the image. Further, the foveation zone is defined by a continuous falloff function which matches the ability of the human visual system to detect detail in the peripheral visual field. FIG. 5 shows the same image with a simulated multi-point foveation. One point of foveation is at the "X" and another point of foveation at the "A". The resulting foveation zones about the "X" and "A" are more detailed than the remainder of the image. In a dynamic environment and at a proper viewing distance, all three of these images would look substantially identical to a viewer whose gaze is directed toward the "X".

It is noted that the processor 40 disclosed herein may be provided by a general purpose microprocessor or a custom processor. The functionality provided by the processor 40 may be implemented in hardware and/or software. The processor 40 may be responsive to a computer-readable medium having computer-readable instructions such as computer program code to direct the acts described with reference to FIG. 1. Typically, the processor 40 is provided by either a general purpose computer system or an application-specific computer system, which is also programmed to provide the functionality of the compressor 50.

It will be apparent to those skilled in the art that the disclosed inventions may be modified in numerous ways and may assume many embodiments other than the preferred forms specifically set out and described herein. For example, the acts described with reference to FIG. 1 may be performed in an order which differs from the order shown in the flow chart. Further, some of the acts may be performed in parallel.

Accordingly, it is intended by the appended claims to cover all modifications which fall within the true spirit and scope of the present invention.

What is claimed is:

1. A method comprising:
   compressing a first scene of an image sequence using a first plurality of foveation zones, each of the first plurality of foveation zones being weighted based on a probability of a viewer looking at a corresponding portion of the first scene; and
   compressing a second scene of the image sequence using a second plurality of foveation zones, each of the second plurality of foveation zones being weighted based on a probability of a viewer looking at a corresponding portion of the second scene;
   wherein the first plurality of foveations zones consists of a different number of foveations zones than the second plurality of foveations zones.

2. A method comprising:
   determining view locations within the first scene for a sample of viewers;
   determining a first plurality of foveation zones based on the view locations;
   estimating a probability for each of the foveation zones based on the view locations;
   weighting each of the foveation zones based on the probability; and
   compressing a first scene of an image sequence using the first plurality of foveation zones, each of the first plurality of foveation zones being weighted based on the probability of a viewer looking at a corresponding portion of the first scene.

3. The method of claim 2 further comprising:
   generating a compressed version of the image sequence based on said compressing; and
   transmitting the compressed version to viewers whose view locations within the image sequence are not monitored.

4. A method comprising:
   determining a first plurality of foveation zones based on a scene type for a first scene;
   estimating a probability for each of the foveation zones based on the scene type for the first scene;
   weighting each of the foveation zones based on a probability; and
   compressing the first scene of an image sequence using the first plurality of foveation zones, each of the first plurality of foveation zones being weighted based on the probability of a viewer looking at a corresponding portion of the first scene.

5. The method of claim 1 wherein each of the first plurality of foveation zones is definable by a continuous falloff function.

6. The method of claim 1 wherein each of the first plurality of foveation zones has a corresponding half-resolution constant based on the probability of a viewer looking at the corresponding portion of the first scene.

7. The method of claim 6 wherein the first plurality of foveation zones comprises a first foveation zone and a second foveation zone, wherein the first foveation zone has a greater probability of a viewer looking at its corresponding portion than the second foveation zone, and wherein the half-resolution constant of the first foveation zone is greater than the half-resolution constant of the second foveation zone.

8. The method of claim 1 wherein each of the first plurality of foveation zones is definable by a discrete function.

9. The method of claim 1 wherein each of the first plurality of foveation zones has a corresponding fixed resolution based on the probability of a viewer looking at the corresponding portion of the first scene.

10. The method of claim 9 wherein the first plurality of foveation zones comprises a first foveation zone and a second foveation zone, wherein the first foveation zone has a greater probability of a viewer looking at its corresponding portion than the second foveation zone, and wherein the resolution of the first foveation zone is greater than the resolution of the second foveation zone.

11. A computer-readable medium having computer-readable instructions to direct a computer to perform acts of:
    compressing a first scene of an image sequence using a first plurality of foveation zones, each of the first plurality of foveation zones being weighted based on a probability of a viewer looking at a corresponding portion of the first scene; and
    compressing a second scene of the image sequence using a second plurality of foveation zones, each of the second plurality of foveation zones being weighted based on a probability of a viewer looking at a corresponding portion of the second scene;
    wherein the first plurality of foveations zones consists of a different number of foveations zones than the second plurality of foveations zones.

12. A computer-readable medium having computer-readable instructions to direct a computer to perform acts of:
    determining view locations within a first scene for a sample of viewers;
    determining a first plurality of foveation zones based on the view locations;
    estimating a probability for each of the foveation zones based on the view locations;
    weighting each of the foveation zones based on the probability; and compressing the first scene of an image sequence using the first plurality of foveation zones, each of the first plurality of foveation zones being weighted based on the probability of a viewer looking at a corresponding portion of the first scene.

13. The computer-readable medium of claim 12 wherein the computer-readable instructions further direct the computer to perform acts of:
generating a compressed version of the image sequence based on said compressing; and
transmitting the compressed version to viewers whose view locations within the image sequence are not monitored.

14. A computer-readable medium having computer-readable instructions to direct a computer to perform acts of:
determining a first plurality of foveation zones based on a scene type for a first scene;
estimating a probability for each of the foveation zones based on the scene type for the first scene;
weighting each of the foveation zones based on a probability; and
compressing the first scene of an image sequence using the first plurality of foveation zones, each of the first plurality of foveation zones being weighted based on the probability of a viewer looking at a corresponding portion of the first scene.

15. The computer-readable medium of claim 11 wherein each of the first plurality of foveation zones is definable by a continuous falloff function.

16. The computer-readable medium of claim 11 wherein each of the first plurality of foveation zones has a corresponding half-resolution constant based on the probability of a viewer looking at the corresponding portion of the first scene.

17. The computer-readable medium of claim 16 wherein the first plurality of foveation zones comprises a first foveation zone and a second foveation zone, wherein the first foveation zone has a greater probability of a viewer looking at its corresponding portion than the second foveation zone, and wherein the half-resolution constant of the first foveation zone is greater than the half-resolution constant of the second foveation zone.

18. The computer-readable medium of claim 11 wherein each of the first plurality of foveation zones is definable by a discrete function.

19. The computer-readable medium of claim 11 wherein each of the first plurality of foveation zones has a corresponding fixed resolution based on the probability of a viewer looking at the corresponding portion of the first scene.

20. The computer-readable medium of claim 19 wherein the first plurality of foveation zones comprises a first foveation zone and a second foveation zone, wherein the first foveation zone has a greater probability of a viewer looking at its corresponding portion than the second foveation zone, and wherein the resolution of the first foveation zone is greater than the resolution of the second foveation zone.

21. An apparatus comprising:
an image compressor to compress a first scene of an image sequence using a first plurality of foveation zones, each of the first plurality of foveation zones being weighted based on a probability of a viewer looking at a corresponding portion of the first scene;
wherein the image compressor is further to compress a second scene of the image sequence using a second plurality of foveation zones, each of the second plurality of foveation zones being weighted based on a probability of a viewer looking at a corresponding portion of the second scene; and
wherein the first plurality of foveations zones consists of a different number of foveations zones than the second plurality of foveations zones.

22. An apparatus comprising:
at least one eye tracking device to determine view locations within a first scene for a sample of viewers;
a processor responsive to the at least one eye tracking device to determine a first plurality of foveation zones based on the view locations, to estimate a probability for each of the foveation zones based on the view locations, and to weight each of the foveation zones based on a the probability; and
an image compressor to compress the first scene of an image sequence using the first plurality of foveation zones, each of the first plurality of foveation zones being weighted based on the probability of a viewer looking at a corresponding portion of the first scene.

23. The apparatus of claim 22 wherein the image processor generates a compressed version of the image sequence, the apparatus further comprising:
a transmitter to transmit the compressed version to viewers whose view locations within the image sequence are not monitored.

24. An apparatus comprising:
a processor to determine a first plurality of foveation zones based on a scene type for a first scene, to estimate a probability for each of the foveation zones based on the scene type for the first scene, and to weight each of the foveation zones based on a probability; and
an image compressor to compress the first scene of an image sequence using the first plurality of foveation zones, each of the first plurality of foveation zones being weighted based on the probability of a viewer looking at a corresponding portion of the first scene.

25. The apparatus of claim 21 wherein each of the first plurality of foveation zones is definable by a continuous falloff function.

26. The apparatus of claim 21 wherein each of the first plurality of foveation zones has a corresponding half-resolution constant based on the probability of a viewer looking at the corresponding portion of the first scene.

27. The apparatus of claim 26 wherein the first plurality of foveation zones comprises a first foveation zone and a second foveation zone, wherein the first foveation zone has a greater probability of a viewer looking at its corresponding portion than the second foveation zone, and wherein the half-resolution constant of the first foveation zone is greater than the half-resolution constant of the second foveation zone.

28. The apparatus of claim 21 wherein each of the first plurality of foveation zones is definable by a discrete function.

29. The apparatus of claim 21 wherein each of the first plurality of foveation zones has a corresponding fixed resolution based on the probability of a viewer looking at the corresponding portion of the first scene.

30. The apparatus of claim 29 wherein the first plurality of foveation zones comprises a first foveation zone and a second foveation zone, wherein the first foveation zone has a greater probability of a viewer looking at its corresponding portion than the second foveation zone, and wherein the resolution of the first foveation zone is greater than the resolution of the second foveation zone.

* * * * *